United States Patent [19]

Schöne et al.

[11] 4,273,334
[45] Jun. 16, 1981

[54] REEL MECHANISM FOR USE IN A PLAYING DEVICE

[75] Inventors: Siegfried Schöne; Joachim Ramlow, both of Berlin, Fed. Rep. of Germany

[73] Assignee: Gunter Wulff-Apparatebau GmbH, Berlin, Fed. Rep. of Germany

[21] Appl. No.: 43,371

[22] Filed: May 29, 1979

[51] Int. Cl.³ .............................................. A63F 5/04
[52] U.S. Cl. .................................. 273/143 R; 310/92; 310/93; 310/100; 310/267; 318/480
[58] Field of Search ............ 273/138 A, 143 A, 143 B, 273/143 C, 143 D, 143 E; 310/92, 93, 100, 123; 188/156, 157, 158; 318/480

[56] References Cited

U.S. PATENT DOCUMENTS

| 3,023,348 | 2/1962 | Gox | 318/480 X |
|---|---|---|---|
| 3,214,717 | 10/1965 | Brodersen | 310/267 X |
| 3,327,822 | 6/1967 | Spencer | 310/92 X |
| 3,626,220 | 12/1971 | Niculescu | 310/93 X |
| 3,904,902 | 9/1975 | Inariba | 310/162 |
| 4,095,795 | 6/1978 | Saxton et al. | 273/143 R |

FOREIGN PATENT DOCUMENTS

| 852792 | 10/1952 | Fed. Rep. of Germany | 310/100 |
|---|---|---|---|
| 1162116 | 1/1964 | Fed. Rep. of Germany | 273/138 A |
| 2823379 | 3/1979 | Fed. Rep. of Germany | 273/143 R |
| 1196768 | 5/1959 | France | 310/92 |
| 1471866 | 4/1977 | United Kingdom | 273/143 R |

*Primary Examiner*—Richard C. Pinkham
*Assistant Examiner*—Arnold W. Kramer
*Attorney, Agent, or Firm*—Fitch, Even, Tabin, Flannery & Welsh

[57] ABSTRACT

A reel mechanism for use in a playing device comprises a DC motor having a rotor formed with an outer apron on which are displayed a plurality of substantially equally spaced symbols which are to be sequentially displayed in a visual field. The rotor rotates about the stator with the rotor having permanent magnetic poles which interact with the stator. The apron has a plurality of perforations or recesses associated with the individual symbols which are scanned by a plurality of phototransistor scanning devices so as to generate for each symbol upon its passing of a particular position unique information scanning signals which identify each of the symbols. These scanning signals through a switching arrangement provide pulsing signals to the DC motor for energizing the magnetic field within the stator to control the commutation of the DC motor in pulsing synchronization, with the scanning signals effecting rotational motion of the rotor while at the same time being indicative of the position of the rotor and the respective symbol displayed in the visual field.

24 Claims, 5 Drawing Figures

REEL MECHANISM FOR USE IN A PLAYING DEVICE

The invention relates to coin-operated gaming devices having one or more rotary bodies bearing symbols to be displayed in a visual field wherein a win or loss may be obtained, depending upon the particular symbol or symbols displayed during operation of the device.

Coin-operated gaming devices, or slot machines, are usually provided with three rotary bodies or wheels, each bearing a plurality of symbols. The bodies are caused to be rotated by the player and the bodies subsequently come to a stop displaying a random combination of symbols. The combination displayed within the visual field may or may not be a winning combination causing a payout, depending upon the internal construction of the machine. There are typically more than one visible combination therefore a win line indicates the combination which determines a win or a loss. In modern coin-operated playing devices equipped with an electronic control apparatus, such as a microprocessor, for example, each rotary body is often provided with its own electric motor to reduce the fabrication expenses incurred by having a joint drive of all rotary bodies and for reasons of safety. The braking apparatus required for each rotary body is incorporated into the rotary body in order to keep the size of the construction as small as possible.

Such a rotary body is known from the prior art (German Pat. No. 1,162,116) and has for its drive an AC motor whose rotor supports the rotary body. The rotor has two concentrically telescoped coils, namely an outer AC coil and an inner DC coil. Aside from the size of the rotary body required by both coils, it is not particularly appropriate for use in a coin-operated playing apparatus controlled by a microprocessor, because the speed of the AC motor is determined by the frequency of the AC, which cannot be influenced by a microprocessor.

While the rotary body is spinning, a random generator associated with the microprocessor determines the ultimate symbol that will result for each rotary body. From the combination of symbols determined in this manner, it computes the amount of any winning combination and controls its payout. For trouble-free operation, it is important that the combination of symbols determined in each case by the random generator appears in the visual field present at the win line or win position of the apparatus. However, this is not assured with the use of an AC motor, because the microprocessor has no influence on the speed of the motor, so that when the motor is slowed down, a combination of symbols may appear in the visual field of the apparatus which does not agree with the combination of symbols determined by the random generator in which a win or loss was determined.

It is an object of the present invention to provide an improved rotary body having a relatively trouble-free operation with a space-saving and economical design.

It is a further object to provide an apparatus wherein the correspondence between the combination of symbols appearing in the visual field of the apparatus and the payout associated with the combination of symbols determined by the control apparatus is assured.

Other objects and advantages of the present invention are set forth in the following detailed description, and in the accompanying drawings of which:

Figure 1:
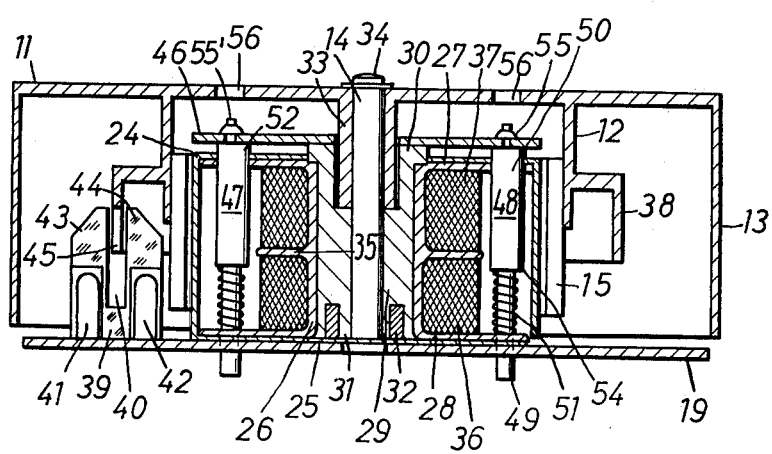
FIG. 1 is a partial cross-sectional view of one embodiment of the present invention.

In accordance with the present invention, an electric motor is designed as a DC motor having a rotor equipped with permanent magnetic poles which interact with the stator. A brake is provided which is switchable into a braking position by de-energizing the magnetic stator field. The rotor has on its outer circumferential surface an apron that is placed parallel and in spaced relation to said surface and which has a plurality of markings, such as perforations or recesses, which are associated with the individual symbols on the rotary body. Several devices are arranged which scan the markings of the apron of the rotating rotor, the number of devices being commensurate with the graduation offered by the number of symbols of the rotary body supported by the rotor. The number and arrangement of the perforations and the scanning devices are such that the scanning devices generate for each symbol upon its passing of a particular position during each rotation of the rotor, unique information signals which identify each of the symbols. A control apparatus, such as a microprocessor, is provided which receives the information and evaluates the information generated when the rotor is stopped to determine the amount of any payout.

With the DC motor being independent of the frequency of the power supplied from the outside to drive the rotary body, the possibility exists of making the commutation, i.e., the rhythm of the motor, dependent on the position of the rotary body and thus of controlling its rhythm sequence. This is accomplished by the stationary scanning members associated with the rotor of the DC motor, which scan the perforations or recesses arranged in the apron of the rotor during the rotation of the rotor, and generate for each symbol arranged on the rotary body unique information signals, whereby the data signals control, via an appropriate switching arrangement, the rhythm or commutation of the motor in synchronization with the rotary body.

At the same time, the data is supplied to the microprocessor, so that at any moment during the operation of the rotary body, the microprocessor will receive the data associated with each symbol as the symbol passes through the win position. The microprocessor is able to assure by comparison with the information signals from the scanning devices whether the rotary bodies have stopped at a position such that the combination of symbols displayed at the win position agrees with the combination of symbols determined by the random generator programmed into the microprocessor. Thus, when the symbols visible at the win position of the stopped rotary bodies show a winning combintion, the payout for the combination determined by the microprocessor corresponds to the visible winning combination.

The arrangement and the number of the light barriers and the perforations of the rotor are, of course, a function of the symbols provided on each rotary body. With a rotary body equipped with ten symbols, four light barriers and five perforations of the rotor suffice to obtain unique information signals for each symbol. This is accomplished, for example, in the following manner. As the symbol 1 is passed, the light barrier 1 furnishes an information signal; at symbol 2, it is the light barrier 2 that furnishes the information signal; at symbol 3, the light barrier 3; at symbol 4, the light barriers 1 and 4; at symbol 5, the light barriers 1 and 2; at symbol 6, the light barriers 1, 2, 3; at symbol 7, the light barriers 1 to 4; at symbol 8, the light barriers 2, 3, 4; at symbol 9, the light barriers 3 and 4; and at symbol 10, the light barrier 4. In this manner, during the rotation of the rotary body, both the switching arrangement used to control the motor rhythm, and the microprocessor, are continuously fed unique data for each symbol, so that the microprocessor determines at any moment which symbol is passing the win position. When the symbol determined by the random generator coincides with the symbol passing the win position, the DC motor is disconnected, whereby the symbol determined by the random generator appears in the visible win position.

For the commutation of the DC motor, i.e., the rhythm-wise repoling of its winding, the data furnished by the light barriers on the one hand and the intervals existing between the data on the other hand, are so utilized that in the switching arrangement a differentiation is made only between data and data-less intervals. Thus, each data interval, independent of its type and each data-less interval, will cause a repoling or commutation of the motor. This can be accomplished simply by alternately coupled switching transistors.

The different data obtained by the scanning of the rotor can be caused also in a manner other than by light barriers, i.e., it can be accomplished by inductive or capacitive coupling. Also, the DC motor may be equipped with one coil or have two coils which are arranged superposed or diametrically opposite in the stator and repoled rhythm-wise.

It is possible to use a disk of magnetically conductive material as a brake, which, during the rotation, is maintained in a disengaged position by the stator of the motor, and it is possible to expediently provide a short circuit ring which evens the attraction of the brake disk. However, the brake disk also may be dispensed with, by utilizing the fact that following the disconnection of the stator field, the permanent magnets of the rotor magnetically engage between two adjacent pole fingers each of the stator. It should be appreciated that the number of engaging positions should correspond to the number of symbols present on a rotary body. In this respect, it is advantageous to generate, following the disconnection of the stator field, in order to shorten the slowing time of the rotary body, a stator field oriented in the opposite direction which is then de-enerzized by disconnecting the stator winding prior to the rotary body coming to rest. This insures that the rotary body stops in the correct position as determined by the random generator.

Figure 2:
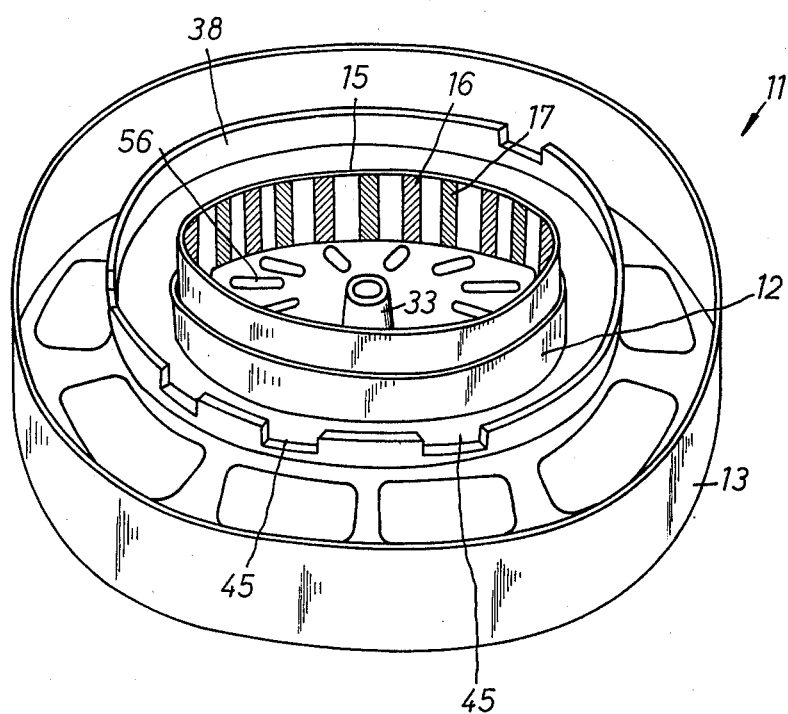
FIG. 2 is a representation in perspective of a rotary body with the rotor arranged thereon, of the embodiment of FIG. 1, viewed from the bottom.
Figure 3:
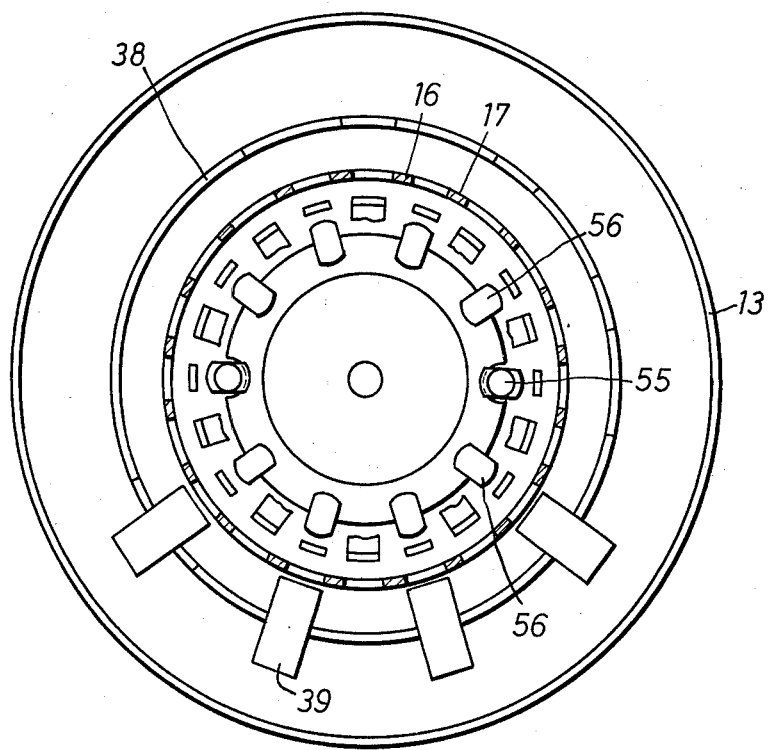
FIG. 3 is a plan view of the rotary body of FIG. 2.

Turning now to the drawings, FIG. 1 shows the structure 10 embodying the present invention to comprise a rotary body 11 having a cylindrical circumferential surface 13. A cylindrical rotor 12 located concentrically relative to the circumferential surface 13 is fastened inside the cylindrical body 11 and accommodated rotatably on a central shaft 14 mounted on a stationary base plate 19. As best shown in FIGS. 2 and 3, premanent magnets 16 and 17, of alternating polarity, are fastened on the inner side 15 of the rotor 12.

Figure 4:
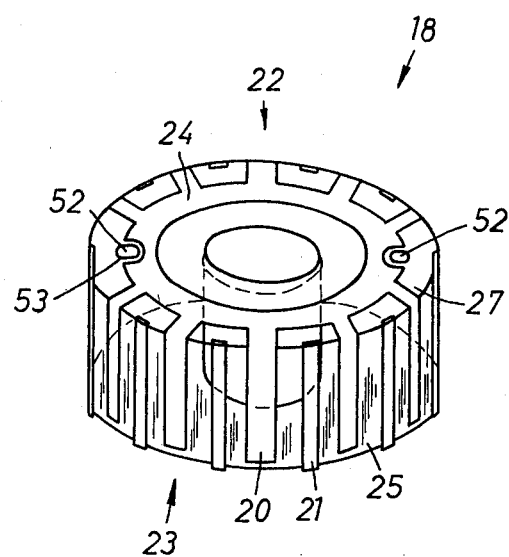
FIG. 4 is a perspective representation of the motor stator.

As shown in FIGS. 1 and 4, the stator 18 consists of two cup-shaped bodies 22 and 23 which form the stator cage. The bodies 22 and 23 have one annular bottom each, 24 and 25, respectively, with vertically arranged pole fingers 20 and 21, respectively, located vertically at the bottom circumference of each cup-shaped body. The pole fingers 20 and 21 intermesh equidistantly. The stator 18 is arranged coaxially in the rotor 12. Both bodies 22 and 23 consist of magnetically conductive material and are fastened to the bottom plate 19 by means of a hub 29 embracing the rotor shaft 14 in its lower area.

The hub 29 carries on its cylindrical circumference a coil holder 26 which is provided with an upper annular flange 27 and a lower annular flange 28, with a central annular flange 35 being provided between them. A coil 37 is arranged between the annular flanges 27 and 35 and a coil 36 is arranged between the annular flanges 35 and 28. Both coils 37 and 36 are wound in opposite directions to each other. For the actuation of the stator 18 and thus of the rotary body 11, DC voltage is commutated as will be shown below.

The rotor 12, as shown in FIGS. 1, 2 and 3, has a bushing 33 fastened centrally in the rotary body 11, and embracing the upper part of the rotor shaft 14 and partially intermeshing into a cylindrical recess provided in the hub 29. The rotary body 11 is fixed on the rotor shaft 14 by means of a disk 34.

On its outer peripheral surface, the rotor 12 bears a downwardly (FIG. 1) oriented apron 38 located parallel and in spaced relation with said rotor, and equipped with five recesses 45. Each of four scanning devices 39 has a slot 40, into which the apron 38 with its perforations and light barriers ride.

The scanning apparatus 39 has two fingers 43 and 44 of transparent material located on opposite sides of the slot 40, and a light emitting diode 41 is provided at the bottom of the finger 43, and a photo-transistor 42 is located in the bottom of the finger 44. The outer sides of the fingers 43 and 44 are equipped with bevels of less than 45° located at the level of the recess 45, so that the photo-transistor 42 of the finger 44 receives via the bevels of the fingers 43 and 44 an impulse from the light emitting diode 41 when a scanning apparatus 39 matches with a recess 45.

Ten different symbols are arranged equidistantly on the circumferential surface 13 of the rotary body 11. Four scanning devices 39 and likewise five recesses 45 are provided for scanning positions of the rotary body associated with these ten symbols. The arrangement is such that with one rotation of the rotary body 11 ten unique sets of information signals are issued by the scanning apparatus 39 and the recesses 45 to the photo-transistors 42. Furthermore, these information signals are distinguished as to the originating rotary body so that certain information signals are associated with each rotary body. During the rotation of the rotary body 11, these information signals are fed by the photo-transistors 42 to a microprocessor (not shown) which evaluates the signals to determine the stopping position to determine the payout of the prize.

As shown in FIG. 1, a brake plate 46 is arranged between the bottom side of the rotary body 11 and the top side of the stator 18 and bearing on its bottom side two diametrically opposite bolts 47 and 48 which penetrate into guide perforations 52 located outside the coils 36 and 37. In their lower area, the bolts 47 and 48 each form a shaft 49 of reduced diameter which in turn penetrate the base plate and the cup-shaped bodies 22 and 23 forming the cage of the stator. A pressure spring 51 is accommodated on the shaft 49 which seats with its one end at the lower bottom of the stator cage and with its other end at a collar 54 formed by the shaft 49. A short circuit copper ring 32 is arranged at the lower end 31 of the hub 29. The upper ends 50 of the bolts 47 and 48 are connected to the brake plate, so that under the urging of the pressure springs 51, it is accommodated in a vertically adjustable manner on the bushing 33. When either of the coils 36 or 37 of the stator is fed DC voltage, the brake plate 46 is attracted against the effect of the pressure springs 51 by the stator, thereby being applied to a ledge 30 of the hub 29.

The brake plate bears on its top side two diametrically arranged conically tapering engagement extensions 55, each equipped with central cylindrical portions 55'. The rotary body 11 is provided with two diametrically opposite engagement slots 56 for the engagement extensions 55, 55'. In order to stop the rotary body 11, the coils 36 and 37 are disconnected. This results in the magnetic field of the stator being eliminated and the brake plate 46 moves upward under the urging of the pressure springs 51 in the guide perforations 52. Its engagement extensions 55 and cylindrical portions 55' engage the two diametrically opposite engagement slots. Naturally, on pair of engagement slots 56 is associated with each symbol of the rotary body 11. During the engagement, the engagement slots 56 first intermesh with the cylindrical portion 55' used as a stop. Through the engagement extension 55, a subsequent centering of the rotary body 11 in relation to the engagement extension 55 takes place whereby one of the symbols of the rotary body 11 appears at the win position in the visual field of the apparatus. As the stator field is turned on anew by the coils 36 and 37, the brake plate 46 is attracted downward by the stator magnetic field into the position shown in FIG. 1, so that the rotary body 11 can again be put into rotation via the rotor 12. In the resposing position of the rotary body 11, the permanent magnetic poles 16 and 17 of the rotor 12 occupy such a position in relation to the pole fingers 20 and 21 of the stator 18 that with the disengagement of the brake plate 46 from the rotary body 11, the simultaneous starting of the magnetic stator field and starting of the rotor is assured. Furthermore, since the slots 45 of the apron 38 have predetermined positions in relation to the light bariers, it is assured by the control apparatus, i.e., the microprocessor, that the polarization of the stator magnetic field in the desired direction is guaranteed in order to start the rotor 12 in said desired direction.

Figure 5:
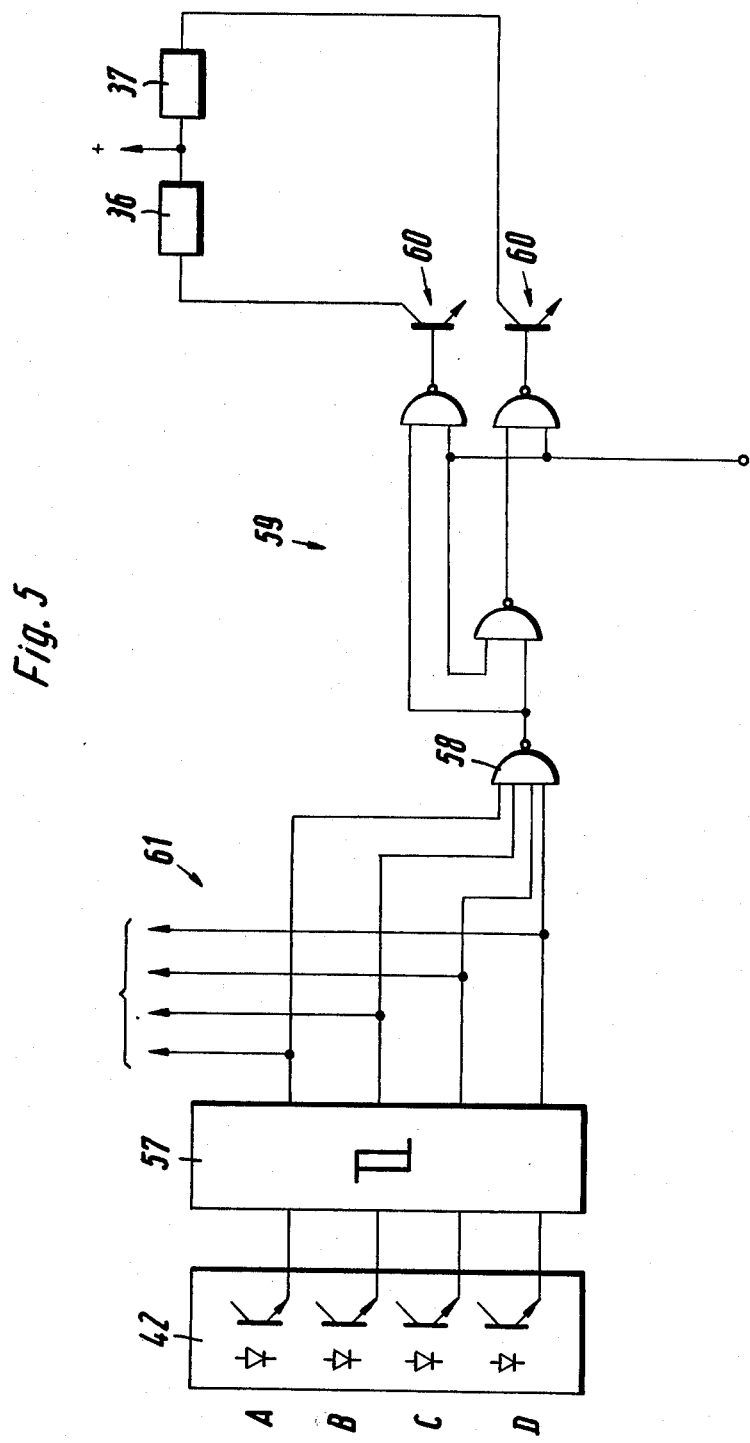
FIG. 5 illustrates a switching apparatus used for the commutation of the motor and controlling the rotary body.

Turning now to FIG. 5, there is shown a circuit arrangement for reversing the polarization of the coils 36 and 37 of the stator 18 as a function of the information signals generated by the light barriers during the rotation of the rotary body 11. The four photo-transistors of the scanning devices 39 are identified by the letters A to D. The photo-transistors transmit their information signals to a trigger circuit 57 and this data is fed via lines 61 to the control apparatus, and also to a NOR gate 58. The output signal of the gate 58 is fed alternately via a bistable circuit 59 to one of two switching transistors 60, whereby voltage is applied alternately to the coils 36 and 37 of the stator, in synchronization with the rotation of the rotary body. Because the same data is transmitted via conduits 61 to the microprocessor, it will only disconnect the coils 36 and 37 when the symbol determined by the random generator enters the visible win position.

It should be appreciated that an improved device has been described for driving rotatable bodies used in coin-operated playing equipment which is particularly adapted for use with such equipment that has electronic control apparatus such as a microprocessor or the like. The device is simple, compact and reliable in its operation and has the advantageous capabilities of functioning as an electric motor for driving the body, a decoder for generating signals indicating the precise angular position of the body and as a brake for stopping the body at a precise angular position in response to appropriate signals that are received by the device from the control apparatus.

Although particular embodiments of the present invention have been illustrated and described, various modifications, substitutions and alternatives will be apparent to those skilled in the art, and, accordingly, the scope of the invention should be defined by the appended claims and equivalents thereof.

Various features of the invention are set forth in the following claims.

What is claimed is:

1. A reel mechanism for use in a playing device, comprising:
   a rotatable body having a plurality of substantially equally spaced symbols to be sequentially displayed in a visual field, said rotatable body comprising a DC motor having a rotor and a stator, said rotor being rotatably disposed about the stator and the rotatable body forming an outer apron disposed about the rotor with said symbols on said outer apron;
   scanning means operatively associated with the rotatable body for generating scanning signals, each of said scanning signals uniquely corresponding to a respective symbol position, which signals are indicative of the rotational position of the rotatable body relative to the visual field;
   switching means operatively connected to the scanning means for receiving said scanning signals therefrom, the switching means providing pulsing signals to the DC motor for energizing the magnetic field within the stator to control the commutation of the DC motor in pulsing synchronization, with the scanning signals thereby effecting rotational motion of the rotatable body, and said scanning signals, at the same time being indicative of the position of the rotatable body and the respective symbol displayed in the visual field.

2. The device of claim 1 wherein said rotor having a plurality of markings associated with individual symbols, said scanning means having means for detecting the markings, and the number and arrangement of the markings being spaced in a manner such that the scanning means generates for each symbol passing into the visual field during the rotation of the rotor, signals uniquely indicative of the particular symbol in the visual field.

3. The device of claim 2 wherein the markings of the apron of the rotor are defined by recesses within the apron.

4. The device of claim 3 wherein upon the de-energization of the stator magnetic field by the switching means, the switching means has means for reversing the pole of the stator magnetic field whereby the slowing time of the rotatable body may be shortened.

5. The device of claim 4 wherein prior to the stopping of the rotary body, the switching means has means for de-energizing the reversed pole of the stator magnetic field so that the poles of the rotor engage opposite pole fingers of the stator and maintain a central position between two stator pole fingers each.

6. The device of claim 5 wherein the number of rotor poles corresponds with the number of engagement positions.

7. The device of claim 1 wherein the stator comprises two cup-shaped bodies of magnetically conductive material which define a cage and are provided with intermeshing fingers to serve as poles, and a coil associated with said cage for generating a rhythmically repoled stator magnetic field.

8. The device of claim 7 wherein the coil is carried concentrically within the cage and the switching means has means for repoling the stator magnetic field.

9. The device of claim 7 wherein the coil comprises two coil portions wound in opposite directions and arranged concentrically one below the other one and said switching means has means for rhythmically and alternately energizing the two coil portions.

10. The device of claim 7 wherein the coil comprises two coil parts oriented parallel with the axis of the cage and are wound in opposite directions and arranged substantially diametrically opposite each other and said switching means has means for rhythmically and alternately energizing the poles of the stator.

11. The device of claim 1 wherein the switching means has means for alternately energizing the magnetic fields within the stator in dependence of the position of the rotary body to cause the rotary body to rotate and the symbols to be sequentially displayed.

12. The device of claim 11 wherein the switching means for alternately energizing the magnetic fields within the stator comprises a bistable switching circuit having switching transistors.

13. The device of claim 12 wherein the switching means is operable to alternately energize the magnetic fields in response to alternating data intervals and data-less intervals.

14. The device of claim 1 further comprising braking means associated with the rotatable body for braking the rotatable body when the DC motor magnetic field is de-energized, whereby the rotatable body can be stopped so that a preselected symbol is displayed in the visual field.

15. The device of claim 14 wherein the braking means comprises a plate of magnetically conductive material accommodated longitudinally between the rotatable body and the stator along a shaft of the rotor and biasing means for urging the plate in the direction toward the rotatable body wherein the plate is held away from the rotatable body against the urging of the spring means by the attractive force of the magnetic field of the stator allowing the rotatable body to rotate freely and the plate is urged against the rotatable body causing the rotatable body to brake when the magnetic field of the stator is absent.

16. The device of claim 15 wherein the stator has a hub defining a ledge and the brake plate has a circular shape and is seated on a ledge of the hub in a released brake position when the stator magnetic field is present.

17. The device of claim 15 wherein the braking means has a narrow coil forming a magnetic short with the brake plate and may be energized with DC during the rotation time of the rotor and rotatable body and is located between the brake plate and the stator.

18. The device of claim 15 wherein the plate defines a surface facing the bottom side of the rotatable body and has a plurality of protruding engagement extensions and the rotatable body is provided with radially oriented engagement slots corresponding to the number of symbols arranged on the rotatable body wherein the engagement extensions are urged under the effect of the spring means in the direction toward the rotatable body to engage the slots of the rotatable body to brake the rotatable body.

19. The device of claim 18 wherein the engagement extensions have a tapering centering cone carried by the surface of the plate, followed by a further extending central cylindrical portion serving as a stop for the engagement slots.

20. The device of claim 18 wherein each engagement extension is carried by a shaft which has a portion of reduced diameter which defines a collar, the stator cage defining guiding recesses through which the shaft is inserted and said spring means having a pressure spring on the shaft seated between the collar of the shaft and the stator cage.

21. The device of claim 18 wherein the rotor has a plurality of poles alternately spaced with opposite pluralities, said engagement extension being arranged on the brake plate in such a position that after braking, the rotatable body reposes in a position such that one pole finger each of the stator is positioned between two poles of the rotor having opposite pluralities wherein upon the disengagement of the brake plate from the rotary body and the simultaneous energization of the stator magnetic field, the starting of rotation of the rotor is assured.

22. The device of claim 1 wherein the scanning means has means for emitting light arranged on one side of the apron of the rotor and photo means for detecting an impulse of light from the light emitting means whereby the photo means detects light from the light emitting means when a recess of the apron is aligned between them.

23. The device of claim 22 wherein the scanning means further includes a body of transparent material for conducting light from the light emitting means to the apron and for conducting light transmitted through a recess of the apron to the photo means.

24. The device of claim 23 wherein the body of transparent material has bevels forming a prism and are placed at an angle at the outer sides of the body of transparent material in the area of the recesses of the apron.

* * * * *

UNITED STATES PATENT AND TRADEMARK OFFICE
CERTIFICATE OF CORRECTION

PATENT NO. : 4,273,334
DATED : June 16, 1981
INVENTOR(S) : Siegfried Schöne; Joachim Ramlow It is certified that error appears in the above—identified patent and that said Letters Patent is hereby corrected as shown below:

On the first page in the bibliographic section between the data of INID codes [22] and [51], insert the following data for INID code [30]:

[30]     Foreign Application Priority Data

June 2, 1978 [DE]  Fed. Rep. of Germany ....P 28 24 863.7

Column 2, line 62, "combintion" should read --combination--.

Column 3, line 55, "de-enerzized" should read --de-energized--.

Column 3, line 66, "premanent" should read --permanent--.

Column 5, line 27, "on" should read --one--.

Column 5, line 40, "resposing" should read --reposing--.

Column 5, line 48, "bariers" should read --barriers--.

Column 8, line 39, "rotary" should read --rotatable--.

Signed and Sealed this

Tenth Day of August 1982

|SEAL|

Attest:

GERALD J. MOSSINGHOFF

Attesting Officer     Commissioner of Patents and Trademarks